United States Patent [19]
Preston et al.

[11] 3,802,540
[45] Apr. 9, 1974

[54] ADJUSTABLE STOP COLLAR FOR SPRING CLUTCH

[75] Inventors: Norman Harvey Preston; Henry M. Korytkowski, both of Rochester, N.Y.

[73] Assignee: Burroughs Corporation, Detroit, Mich.

[22] Filed: Dec. 20, 1972

[21] Appl. No.: 317,090

[52] U.S. Cl.............................. 192/12 BA, 192/26
[51] Int. Cl............................................. F16d 67/02
[58] Field of Search............. 192/12 BA, 12, 26, 56

[56] References Cited
UNITED STATES PATENTS

| | | | |
|---|---|---|---|
| 3,021,512 | 2/1962 | Welsh et al..................... | 192/12 BA |
| 3,277,986 | 10/1966 | Beare............................. | 192/12 BA |
| 3,376,963 | 4/1968 | Schaefer........................ | 192/12 BA |
| 3,434,576 | 3/1969 | Blodgett........................ | 192/12 BA |

*Primary Examiner*—Benjamin W. Wyche
*Assistant Examiner*—Wesley S. Ratliff, Jr.
*Attorney, Agent, or Firm*—Carl Fissell, Jr.

[57] ABSTRACT

The present invention comprises a spring clutch having external means for incrementally adjusting spring tension between the drive spring and the brake spring of a spring clutch. A cylindrical spring clutch stop collar is provided with a notch for restraining one tang of the clutch drive spring and an even number of holes equally spaced about the circumference of the collar. An adjusting shell is fitted slidably over the stop collar and has a notch for restraining the opposing tang of the clutch brake spring and a number of holes equal to that one the stop collar plus two equally spaced about circumference of this adjusting shell. To adjust the spring tension, the adjusting shell is rotated about the stop collar until the desired spring tension is achieved and a hole in the adjusting shell aligns with a hole in the stop collar. A pin is then inserted through the holes to lock the shell to the collar at the desired tension. Due to the nature of the hole alignment, the spring tension may be adjusted incrementally. If N equals the number of holes on the stop collar, then the stop collar and adjusting shell may be pinned together at increments of 2 × 360 N N + 2 degrees.

14 Claims, 12 Drawing Figures

PATENTED APR 9 1974 3,802,540

ADJUSTABLE STOP COLLAR FOR SPRING CLUTCH

BACKGROUND OF THE INVENTION

A search of the prior art has developed the following U.S. Pat. Nos.:

3,616,883, Sindelar, Nov. 2, 1972; 3,559,781, Brunelle, Feb. 2, 1971; 3,545,580, Bear, Dec. 8, 1970; 3,521,730, Weatherby, July 28, 1970; 3,220,523, Hepner, Nov. 20, 1965; 3,181,669, Kunde et al., May 4, 1965; 2,864,481, Strecker, Dec. 16, 1958; 1,981,504, Goodwin, Nov. 20, 1934; 1,255,547, Maynard, Feb. 5, 1918.

The field of spring clutches and the art developed therein is extensive and well known. Many different and varied arrangements have been suggested for adjusting and changing the tension of the coupling and decoupling arrangements used with such clutches. However, the subject matter and technique of the present invention is not shown or described in any of the prior art presently known to applicant.

SUMMARY OF INVENTION

The present invention is concerned with the problem of the transmission of rotary power in small or relatively small increments at very high speed. The invention relates to an adjustable stop collar for a spring clutch wherein there is provided means for adjusting spring tension without the necessity or requirement for disassembly of the clutch.

The apparatus of this invention is provided with external means for incremently adjusting the spring tension of the clutch. A cylindrical spring clutch stop collar includes a notch for restraining one tang of the clutch drive spring and an even number of holes or apertures spaced around the circumference thereof equally.

An adjusting shell fits over the stop collar and has a notch for restraining the opposite tang of the clutch brake spring and a number of holes equal to that on the stop collar plus two equally spaced about the circumference of the shell. To adjust the spring tension the adjusting shell is rotated about the stop collar until the desired spring tension is achieved and a hole in the adjusting shell aligns with a hole in the stop collar. A pin is then inserted through the aligned holes to lock the shell to the collar at the desired tension. Due to the nature of the hole alignment, the tension may be adjusted incrementally. If N equals the number of holes on the stop collar, then the stop collar and adjusting shell may be pinned down together at increments of 2 × 360 NN + 2°.

It is an important object therefore, of the present invention to provide a novel spring clutch adjusting means which avoids the necessity for disassembly of the clutch in order to make incremental adjustment thereof.

Another important object of the invention is to provide a spring clutch mechanism wherein the adjusting elements are fabricated from synthetic materials in order to lower the operating inertia thereof and this increase the speed of actuation of the clutch.

Still another object of the invention is to provide means permitting a high degree of relatively small incremental adjustments of a clutch mechanism in a simple, easily accessible, and efficient manner.

A further object of the invention is to provide a novel electromagnetic energization and deenergization means for the spring clutch.

PREFERRED EMBODIMENT OF THE INVENTION

Figure 1:
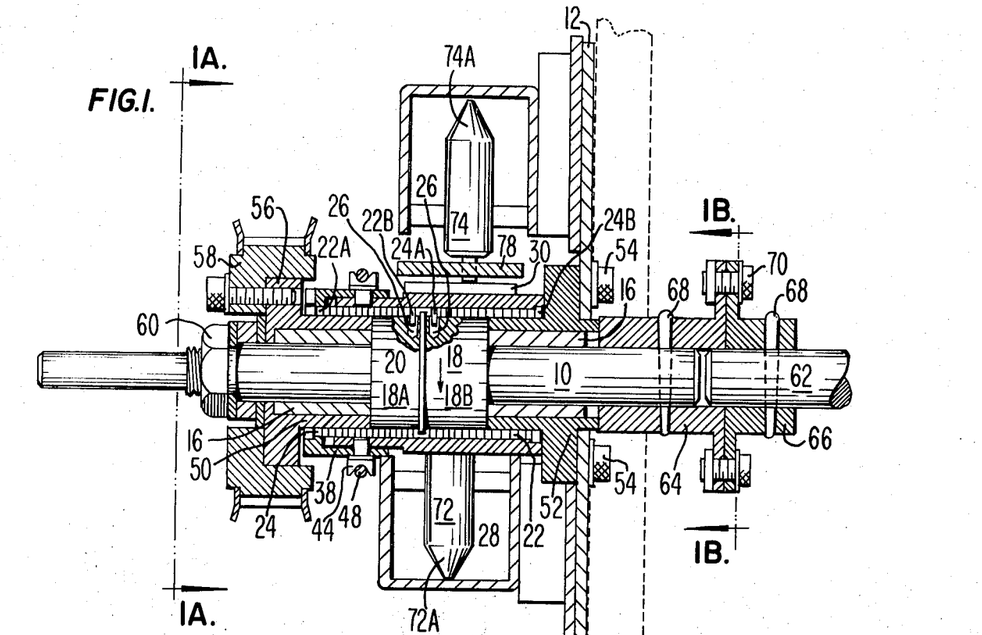
FIG. 1 is a sectional side elevational view of one embodiment of the present invention.

Referring to FIG. 1 of the drawings, it is seen that the rotary clutch of the present invention is supported upon a horizontally disposed elongated shaft member 10 which is mounted for rotation in and projects from a vertically projecting rigid structural support member 12. In order to prevent the shaft from rotating in reverse direction from that in which the input drive is or may be rotated, and to prevent the shaft from rotating at a greater angular velocity, a pair of oppositely disposed Torrington Roller clutch bearings 16—16 are employed and shaft 10 is adapted to rotate therein. The center portion of the shaft 10 is provided with an enlarged boss 18 which is interrupted intermediate its ends by a circular raised land portion 20. The boss provides a pair of oppositely disposed smooth surface portions 18a and 18b for receiving two circular spring members 22–24 identified as drive and brake springs, respectively of square cross section, as shown. The opposite ends of each spring are provided with projecting tangs 22a–22b and 24a and 24b. As seen in the drawing, the inboard pair of tangs 22b and 24a are receivable in respective openings or depressions 26—26 in boss 18, on opposite sides of the raised land 20 permitting the springs to be immobilized at their ends.

Figures 2, 3:
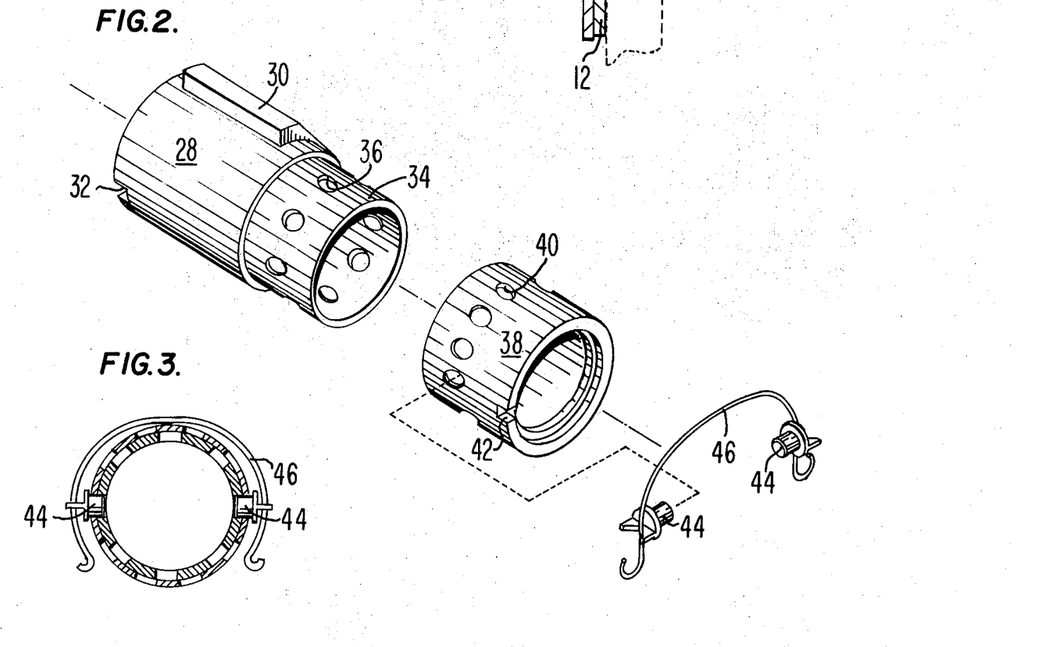
FIG. 2 is an exploded isometric view of the stop collar and mating adjusting collar of the invention.
FIG. 3 is a cross sectional view of the elements of FIG. 2 illustrated in their assembled condition.

Surrounding the springs 22-24 and extending substantially from end to end thereof is an elongated cylindrical stop collar member 28, FIGS. 1 and 2 of DELRIN or CELCON material provided at one surface portion thereof with an integral raised cam like projection 30 and including a square notch 32 (FIG. 2) at the outboard end thereof for receiving and restraining the tang 24b of spring 24. The rightward end of stop collar member 28 has reduced portion 34 and a series of circumferential perforations, or holes 36, for purposes to be explained shortly.

Telescopically receivable in slip fit engagement with the stop collar member 28 is a circular shell-like adjusting member 38 which is fitted over the reduced end 34 of the stop collar 28 and includes a number of circumferential apertures 40 equal to the number in the stop collar plus two. The shell provides a circular adjustment of the angular relationship between the tangs 22a and 24b of the two springs 22 and 24. The outboard end of the adjustment shell includes a square notch 42 for receiving the outboard spring tang 22a therein.

To retain the adjustable shell 38 in the desired position with respect to the stop collar 28 a pair of rigid pin members 44 FIG. 3 are adapted to be received through oppositely disposed aligned holes 36 and 40 disposed 180° apart and to be retained in this position by means either of a spring clip 46 as shown in FIGS. 2 and 3 or an O-ring 48; for example, of rubber or neoprene as shown in FIG. 1.

Abutting opposite edges of boss 18 are oppositely disposed supporting hub members 50 and 52, which together provide a bearing surface for the opposite outboard ends of each of the two spiral springs 22 and 24, respectively. The rightward hub member 52 is fixedly mounted, as by bolts 54, in the vertical support member 12. Leftward hub member 50 is secured as by bolts within a circular depression or cut out 56 in an input toothed drive member 58 and is rotatable therewith. Both hubs 50 and 52 are received over the previously described Torrington clutch bearings. Drive wheel 58 is rotatably mounted on shaft 10 on bearing 16 and is secured thereto as by the hexagonal nut 60 threaded over the shaft end as shown in FIG. 1.

In order to transmit rotative power from the input drive wheel 58 to an output power receiving device (not shown) such, for example, as a continuous forms burster of the type described and claimed in copending U.S. application Ser. No. 210,737 in the names of R. H. Colwill et al., entitled Bursting and Separating Apparatus for Continuous Forms, assigned to the same assignor as the present invention; or a high speed check item signer, shaft 10 is coupled to an output shaft 62 by means of conventional coupling members 64 and 66, attached to shaft 10 and shaft 62 as by dowel pins 68. Bolts 70 secure the coupling members together for rotation as a unitary assembly.

Figure 1A:
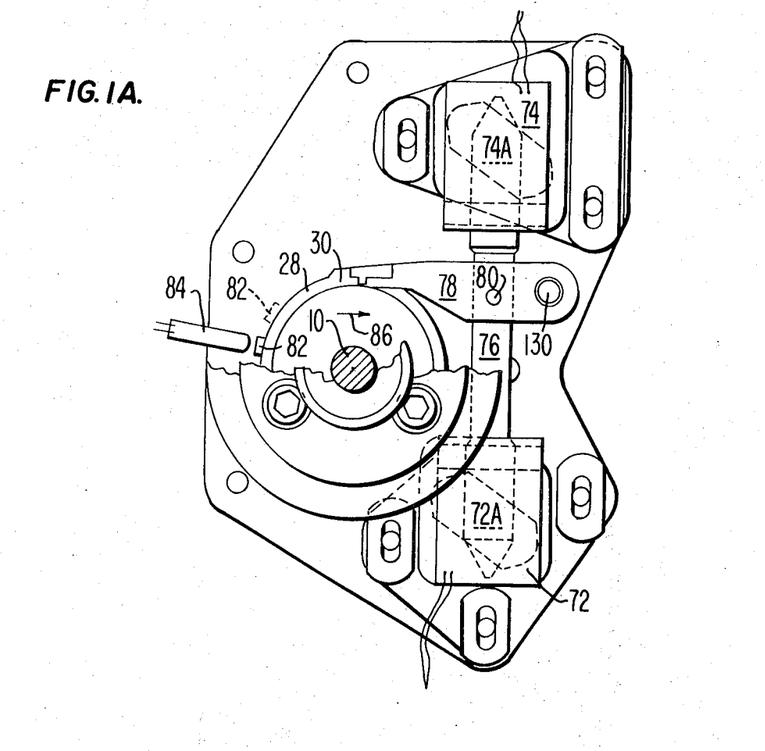
FIGS. 1A and 1B are views taken along the lines 1A—1A and 1B—1B of FIG. 1, respectively.
Figure 1B:
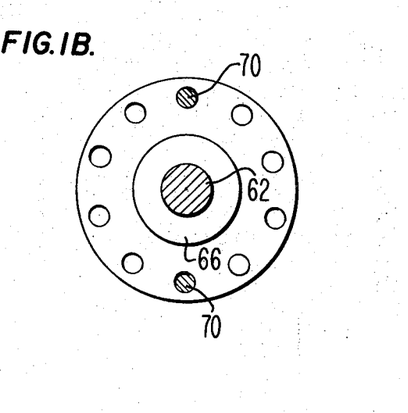

In the embodiment of invention illustrated in FIG. 1, the clutch is adapted to be controlled in its incremental operation at high speed by means of oppositely disposed electromagnetic solenoids 72 and 74. The plungers 72a and 74a of the two solenoids are coupled together through a reciprocable link 76, FIG. 1a to a stop arm 78 by means of a pin 80. Stop arm 78 is provided with a reduced end portion adapted to abut the confronting face of the raised cam projection 30 on stop collar member 28.

So as to assure positive engagement and disengagement of the stop arm with the cam projection 30 an additional control mechanism is provided as will now be described.

Secured to the peripheral surface of the stop collar 28 is a reflective member 82 such, for example, as a piece of silver foil or aluminium. This small relatively highly reflective material is attached to the surface as by any well-known adhesive material. Mounted adjacent to the stop collar member 28 in a location so as to be positioned to receive reflected light photo cell from the member 82 is a photo cell member 84. The combination of the reflective material 82 and the photocell 84 act in the nature of a control switch for energising solenoids 72 and 74.

Thus, when it is desired to transmit rotative power from input drive wheel 58 to output drive shaft 62 the winding of solenoid 74 is first energised in a known manner from a suitable source of electrical energy causing the plunger 74a to retract the stop arm 78 out of the way of the cam projection 30. Driving torque is thus transmitted to coiled drive spring 22 surrounding hub member 18a tightening this spring and causing the stop collar 28 to rotate clockwise in the direction of the arrow 86. This rotative movement causes the reflective member 82 to move clockwise out of the way of photocell 84, the latter being connected electrically to the power source not shown and to the winding of the solenoid 72. Interruption of the reflective light to the photo cell, energises solenoid 72 causing plunger 72a to retract the stop arm 78, so as to permit the latter to contact and ride upon the surface of the stop collar 28 so that the forward or leading edge of the stop arm once again contacts and abuts the cam projection 30. Spring 22 is caused to release causing spring 24 to wind up tightly about the boss 18b immediately stopping the rotative movement of shafts 10 and 62.

The embodiment of the spring clutch seen in FIGS. 4 – 10 inclusive illustrates a modification of the inventive concept shown and described with respect to FIGS. 1 – 3 inclusive. Certain similarities and dissimilarities are immediately apparent. Among other things the control of the actuation of the clutch mechanism is completely different in the subsequent embodiment from that of FIGS. 1 – 3. Also, the input drive arrangement is different and to a large extent simplified in overall construction. Finally, the output mechanism is completely different from that described in conjunction with the illustration of FIGS. 1 – 3 inclusive.

Figure 4:
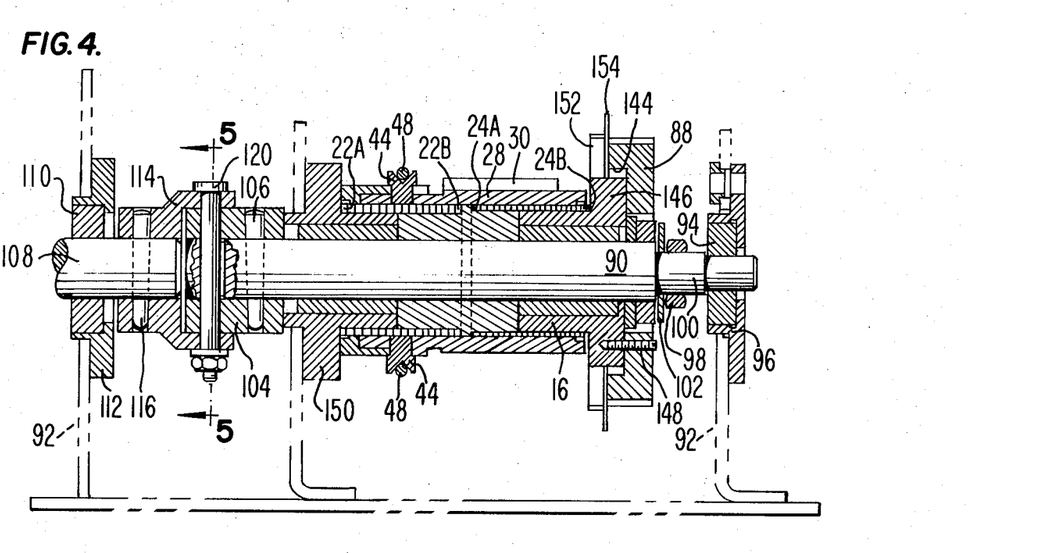
FIG. 4 is a sectional side elevational view of another embodiment of the invention.

Referring now to FIG. 4 in detail, it is seen that the spring clutch is arranged to have an input drive wheel 88 disposed on the right side of the assembly as viewed in this figure. The elongated central shaft member 90 is supported by two vertical wall support members 92. The rightward end of the shaft 90 has its reduced end portion rotatably mounted in a bearing member 94, which is press fitted into a bearing support 96 with the latter being attached to the vertical bracket 92. Hexagonal nut 98 threaded over intermediate reduced portion 100 of shaft 90 together with washer 102 retains the clutch assembly on shaft 90.

The leftward end of shaft 90 is rotatably supported in bearings as described in connection with FIG. 1. The extreme left end of shaft 90 is received by and extends into an input coupling member 104 which is secured to the shaft by means of a dowel pin 106 extending vertically therethrough. An output shaft 108 is rotatably journaled in bearing 110 press fitted into bearing support 112 which is secured in vertical wall member 92. An output coupling 114 pinned by dowel pin 116 to output shaft 108 is telescopically received over input coupling 104 and secured thereto by bolt 120 so as to transmit rotative torque from shaft 90 to shaft 108.

Figures 5, 6:
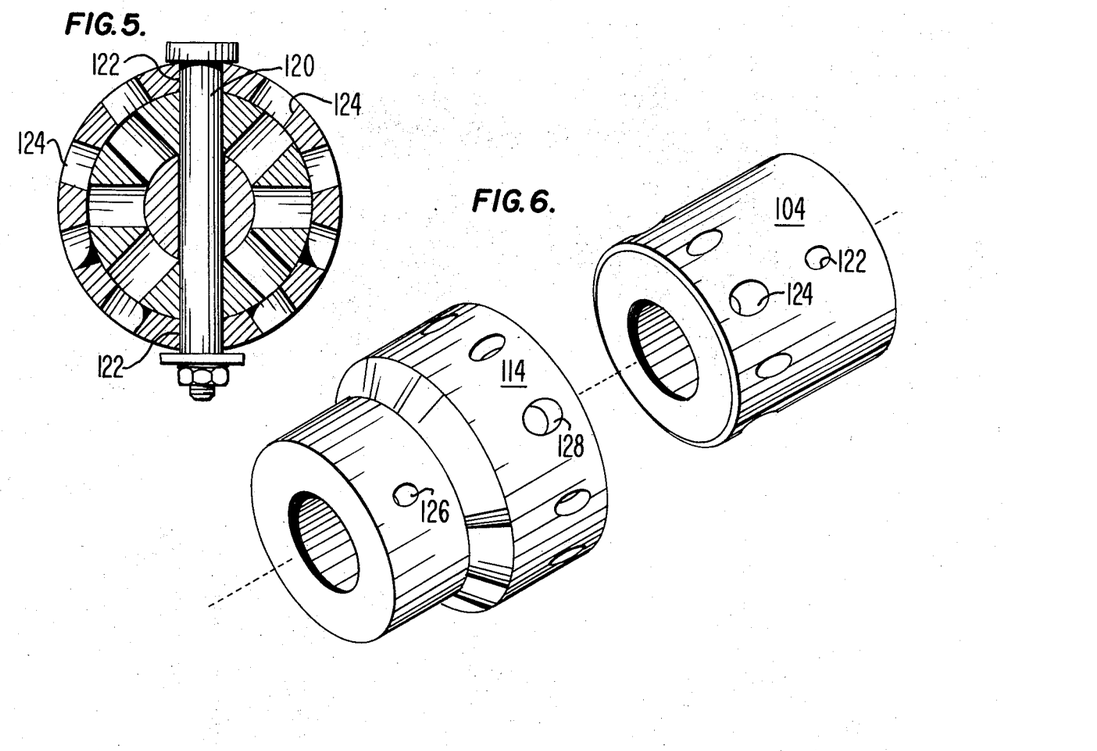
FIG. 5 is a sectional view taken along the line 5—5 of FIG. 4 illustrating the coupling apparatus of the invention.
FIG. 6 is an exploded isometric view of the coupling mechanism of FIG. 4.

Input coupling 104 is provided, as shown most clearly in the exploded view of FIG. 6, with dowel pin receiving apertures 122 and a plurality, e.g., eight holes 124 peripheraly arranged about the circumference of the end of the coupling. Coupling member 114 is likewise provided with dowel pin receivings openings 126 therethrough and a plurality, e.g., 10 holes 128 arranged around the peripheral end of the coupling. When the two couplings 104 and 114 are telescopically joined as shown in FIGS. 4 and 5, bolt 120 secures the couplings in a desired prearranged angular position. This position can be easily, simply, and quickly altered without complete disassembly merely by removing the bolt 120 and rotating the output coupling member to the desired position. This arrangement provides low inertia with respect to the remainder of this assembly.

As previously noted the structural configuration and arrangement of the parts of the spring clutch per se are substantially identical to that of FIG. 1, with certain differences as noted.

The clutch of the present invention is adapted for employment with a high speed item or check signer or for a continuous forms burster mechanism such as that previously referred to herein above. The mechanism must therefore be capable of actuation at extremely high speed. To this end positive solenoid actuation is employed. Referring now to FIGS. 4 and FIGS. 7 – 10 inclusive, it is noted that, as seen particularly in FIG. 7, the vertical frame supporting members 92 are adapted to support a cross shaft 130 extending there between and having mounted by means of its inboard end the stop arm 78. Stop arm 78 is rockably vertically pivoted on shaft 130. Also secured to shaft 130 by an L shaped bracket 132 is an electromagnetic solenoid 134. Mounted for horizontal and vertical pivotal movement on the bracket 132 and extending normal to the bracket and parallel to the long dimension of stop arm 78 is an irregularly shaped clapper member 136 (FIG. 8). The forwardly extending end portion of clapper 136 carries at its extreme end a cam follower roller 138, for purposes to be explained presently. The rearward end of the clapper is arranged to be contiguous with the actuating element or core of the solenoid. A spring 140 secured at one end to the clapper and its opposite end to the stop arm 78 biases the clapper angularly, as shown, out of engagement with the solenoid. An adjusting device in the form of threaded bolt 142 is threadedly mounted on and projects through support member 92 to contact the clapper 136 providing means for effectively adjusting the gap between the clapper and the solenoid.

Gear wheel 88, which is provided with a series of peripheral teeth for engagement with a drive belt (not shown) is provided with a circular recess 144 (FIG. 4), for receiving the righthand input hub member 146. The hub is attached to the gear wheel by means of bolts 148. Hub 146 is adapted to be rotatably mounted on the Torrington clutch bearings 16 for one way rotative movement. The opposite end of shaft 90 carries a hub 150 mounted on Torrington clutch bearing 16 for rotation on shaft 90. Secured by bolts or suitable fastening means (not shown) to the inner peripheral face of gear wheel 88 is a cam assembly including a cam 152 and a disk like member or back plate 154. Cam 152 is provided with a series of toothlike projections 156 FIG. 8 disposed in even increments around the rim thereof and engageable with cam follower roller 138 as shown most clearly in FIGS. 7 and 8. It is noted that the stop arm 78 is normally biased into engagement with the stop projection 30 by means of a spring 158 attached to a post 160 projecting from the stop arm 78 and post 162 projecting from support member 92. It is noted also that in its rest condition clapper 136 is angularly disposed relative to cam 152 so that the cam follower roller 138 is out of the path of movement of the cam 152 as wheel 88 is rotated.

Stop arm is provided with a horizontal projecting pin 164 which is receivable in a slot 166 in the lower depending portion 168 of irregularly shaped clapper 136 to accomodate horizontal or sidewise motion.

Figure 7:
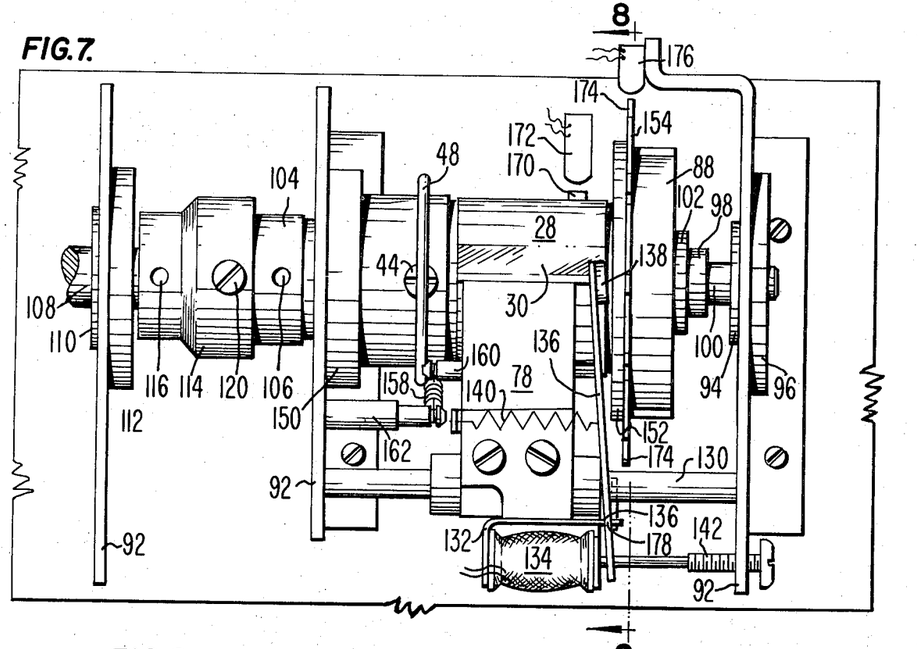
FIG. 7 is a top plan view of the assembled clutch of FIG. 4 including the cam actuated solenoid control and photo optical solenoid timing apparatus used therewith.
Figure 8:
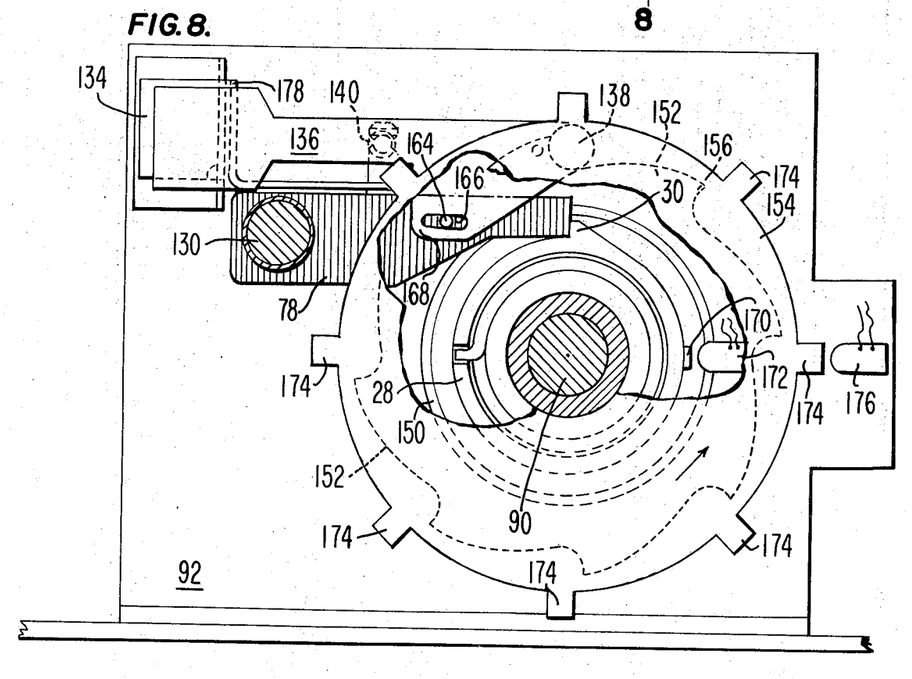
FIG. 8 is an enlarged sectional side elevational view taken along the line 8—8 of FIG. 7.

As seen most clearly in FIGS. 7 and 8 stop collar 28 carries on its outer peripheral surface a reference member or mark 170 of reflective material, e.g., metal or metallized plastic operably associated with a photo cell 172. Photo cell 172 is physically located in a position adjacent the mark 170 so as to direct the reflected light therefrom as the stop collar is rotatably indexed and thus forms a detection transducer for purposes to be explained presently.

The circular back plate or ring member 154 is provided with a plurality of integral peripheral castellations or projections 174 equal in number to the cam lobes or projections 156. Each projection 174 is arranged adjacent to the curved portion of its associated cam lobe 156 as seen in FIG. 8. A photo cell 176 is disposed adjacent to the confronting edge of the projections 174 so as to intercept the light reflected therefrom as the ring 154 is indexibly rotated.

Figure 9:
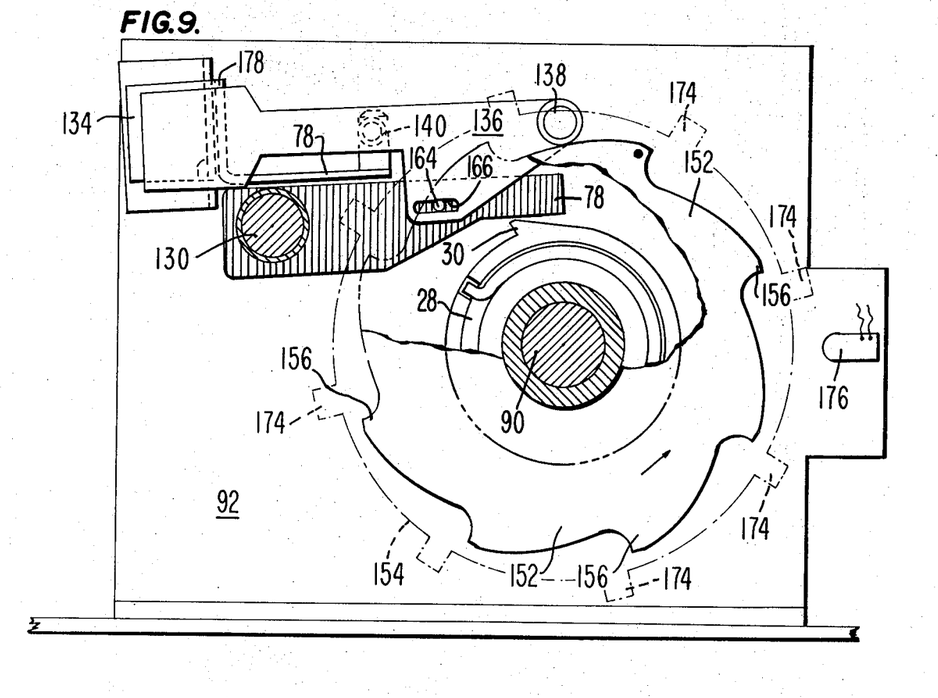
FIGS. 9 and 10 are independent motion views of the cam control mechanism of the invention.
Figure 10:
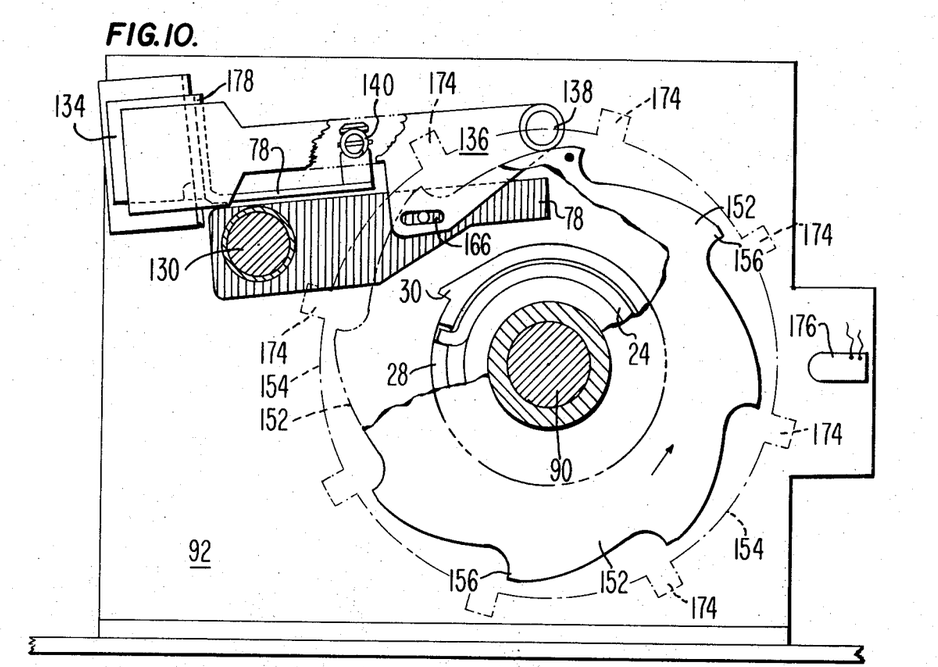

Clutch members 88, 152 and 154 are adapted to be constantly driven in the direction indicated by the arrow in FIGS. 8 – 10 by means of a notched driven belt (not shown) from an external source of power. As illustrated in FIG. 9 there is a finite time interval in the revolution of cam 152 during which roller 138 attached to arm 136 may be brought into position over cam 152 without contacting the face of the arm. This time interval is referred to as the "window." When a signal for clutch operation is received by the machine logic the reference projection 174 on ring 154 in conjunction with detection transducer 176 determine when solenoid 134 should be energized so as to activate arm 136 and roller 138 to utilize the "window" on cam 152. When a projection 174 is directly opposite photo cell 176 solenoid 134 is energized. Arm 136 rotates horizontally about its pivot point 178 and positions roller 138 over cam 152.

As the cam 152 continues to rotate from the position shown in FIG. 8, roller 138 comes into contact with a cam lobe and rides upwardly along the curved inclined surface thereof (between adjacent projections or lobes) raising stop arm 78 FIG. 9 out of contact with stop collar projection 30. As soon as stop arm 78 is clear of projection 30, stop collar 28 starts rotating under influence of the torque stored in the clutch springs. Rotative movement of stop collar 28 rotatively moves reference mark 170 away from detection transducer 172 which deenergizes solenoid 134. Arm 136 carrying roller 138 is returned to its normal or rest position under urging of springs 140 and 158. The clutch continues to rotate until projection 30 on stop collar 28 again contacts and abuts the leading end of stop arm 78 and a reference mark or projection 170 is positioned adjacent to transducer 172 at which time the clutch system is ready for the next operation.

While the drawings show and describe only one stop projection 30 on stop collar 28, it is to be understood that there may be more than one such projection if is desired to rotate the output through less than 360° in any one operation of the clutch. Also, it is noted that the drawings show and describe eight lobes 156 on cam 152 together with eight reference marks or projections 174 on ring 154. The desired number is based upon the timing desired for clutch operations and may be changed as need arises.

What is claimed is:

1. A spring clutch including an adjustable stop collar therefor comprising:

an elongated shaft including an enlarged boss intermediate the ends thereof, oppositely disposed hub members rotatable upon said shaft and coaxially arranged with respect to said boss, the surface of said hub members and said boss forming a substantially uninterrupted bearing surface, oppositely disposed spring members surrounding said hub members with one end of each of said spring members being fixed within said boss said spring members being coaxially aligned on said bearing surface.

an elongated cylindrical member having a reduced end portion and a plurality of circumferentially disposed apertures therein mounted coaxially with said springs and extending substantially from end to end thereof and including a spring retaining notch for receiving therein the free end of one of the springs, an adjustable cylindrical member telescopically received over the reduced end portion of said elongated cylindrical member and including a plurality of circumferentially disposed apertures therein and having a spring retaining notch for receiving therein the other free end of the other spring, means receivable in the aligned apertures of the respective cylindrical members for fixing and retaining the angular relationship between said members, and, means operably associated with said elongated cylindrical means for stopping the rotative movement thereof in accordance with an externally applied signal whereby rotative torque is transmitted from an input drive member with which said adjustable cylindrical member is associated to an output device.

2. The invention in accordance with claim 1 wherein said means for stopping rotative movement of said clutch includes oppositely disposed solenoid means arranged adjacent to said shaft and including means operably associated therewith engageable with said elongated cylindrical member capable of stopping the rotative movement thereof, a metalized area on said elongated cylindrical member and, a photocell oriented in a direction so as to receive light reflected thereto from said metalized area as said cylindrical member is rotated, an electrical means interconnecting the windings of said solenoid means and said photocell to a source of electrical energy whereby rotative movement of said cylindrical member energises and deenergises said solenoid means thus to active and deactivate said clutch.

3. The invention in accordance with claim 1 wherein said means for stopping rotative movement of said clutch includes a pair of oppositely disposed electromagnetic solenoids arranged adjacent to said shaft and including a member opperably associated therewith engageable with said elongated cylindrical member interfering with the rotative movement thereof, a metalized area on said elongated cylindrical member and, a photocell oriented in a direction so as to receive light from said metalized area as said cylindrical member is rotated, an electrical means interconnecting the windings of said solenoids and said photocell.

4. The invention in accordance with claim 1 wherein said stopping means comprises a stop member integral with said elongated cylindrical member, electromagnetic means adjacent to said elongated shaft and carrying means operably engageable with said stop member, said electromagnetic means being responsive to electrical signals applied thereto for moving said stop member effectively, starting and stopping said clutch.

5. The invention in accordance with claim 1 further including, oppositely disposed roller clutch members rotative on said shaft providing one way bearings for said hubs thereby preventing reverse rotative movement of said shaft.

6. The invention in accordance with claim 1 wherein said means for fixing and retaining said angular adjustment comprises a pair of rigid members receivable in said aligned apertures and retaining means preventing accidental loss or dislodgment of said rigid member.

7. The invention in accordance with claim 1 wherein said means receivable in said aligned apertures of the respective cylindrical members further includes a flexible O-Ring of rubber or neoprene for retaining said means in their fixed aligned locations.

8. Invention in accordance with claim 1 wherein said electromagnetic means includes oppositely disposed solenoids, each of which is provided with a reciprocable plunger arranged normal to said shaft and opperably connected to a pivoted link, said link being opperably associated with said stop member for reciprocably activating and deactivating said clutch.

9. A spring clutch comprising an adjustable stop collar therefor comprising:

an elongated shaft including an enlarged integral structural boss intermediate the ends thereof, and a central raised land encircling said boss, oppositely disposed hub members rotatable upon said shaft and coaxially arranged with respect to said boss, the surface of said hub members and said boss forming a substantially continuous bearing surface, oppositely disposed spring members surrounding said hub members with one end of each of said spring members being fixed within said boss, abutting opposite sides of said land, said spring members being coaxially aligned on said continuous bearing surface, an elongated cylindrical member having a reduced end portion and a plurality of circumferentially disposed apertures therein mounted coaxially with said springs and extending substantially from end to end thereof and including a spring retaining notch for receiving therein the free end of one of the springs, an adjustable cylindrical member telescopically received over the reduced end portion of said elongated cylindrical member and including a plurality of circumferentially disposed apertures therein and having a spring retaining notch for receiving therein the other free end of the other spring, means receivable in the aligned apertures of the respective cylindrical members for fixing and retaining the angular relationship between said members, means operably associated with said elongated cylindrical means for stopping the rotative movement thereof in accordance with an externally applied signal whereby rotative torque is transmitted from an input drive member with which said elongated cylindrical member is associated to an output device, cam means operably associated with said stopping means for activating said latter means in precise predetermined increments, and timing means operably associated with said cam means and said stopping means for responsive to said applied signal for controlling operation of said clutch.

10. The invention in accordance with claim 9 wherein said said stopping means comprises an electromagnetic solenoid having a clapper engageable with said cam means and wherein said cam means carries a circular disk-like cam member operably associated with photo optical means responsive to said applied signal for controlling said clutch.

11. The invention in accordance with claim 10 wherein said clapper is pivotally moveable horizontally and vertically to effect sequential control of said clutch operation.

12. The invention in accordance with claim 9 wherein said timing member includes a series of eight peripheral castellations operably associated with said photo optical means.

13. The invention in accordance with claim 12 wherein the castellations of said timing member are arranged adjacent to respective cam lobes of said cam member.

14. The invention in accordance with claim 9 wherein said timing means operably associated with said stopping means comprises one or more reflective members disposed on said elongated cylindrical member at right angles to said stopping means and operably associated with a photo cell member for actuating said stopping means.

* * * * *